(12) United States Patent
Premkumar et al.

(10) Patent No.: US 9,716,633 B2
(45) Date of Patent: Jul. 25, 2017

(54) ALARM PREDICTION IN A TELECOMMUNICATION NETWORK

(71) Applicant: Telefonaktiebolaget LM Ericsson (publ), Stockholm (SE)

(72) Inventors: Karthikeyan Premkumar, Chennai (IN); Subramanian Shivashankar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/029,834

(22) PCT Filed: Oct. 18, 2013

(86) PCT No.: PCT/SE2013/051218
§ 371 (c)(1),
(2) Date: Apr. 15, 2016

(87) PCT Pub. No.: WO2015/057119
PCT Pub. Date: Apr. 23, 2015

(65) Prior Publication Data
US 2016/0261468 A1    Sep. 8, 2016

(51) Int. Cl.
*H04W 24/00* (2009.01)
*H04L 12/24* (2006.01)
*H04W 24/04* (2009.01)
*H04L 12/26* (2006.01)

(52) U.S. Cl.
CPC .......... *H04L 41/147* (2013.01); *H04L 41/069* (2013.01); *H04L 41/0677* (2013.01); *H04L 41/0681* (2013.01); *H04L 41/16* (2013.01); *H04W 24/04* (2013.01); *H04L 41/12* (2013.01); *H04L 41/142* (2013.01); *H04L 43/16* (2013.01)

(58) Field of Classification Search
CPC ....... H04W 24/00; H04W 88/02; H04W 4/16; H04L 41/12
USPC ........................ 455/424, 422.1, 445; 370/254
See application file for complete search history.

(56) References Cited

U.S. PATENT DOCUMENTS

| 4,387,456 A | 6/1983 | Creteau |
| 5,724,263 A | 3/1998 | Raguram et al. |
| 5,920,542 A | 7/1999 | Henderson |
| 6,353,902 B1 | 3/2002 | Kulatunge et al. |

(Continued)

FOREIGN PATENT DOCUMENTS

GB     2 407 451     4/2005

OTHER PUBLICATIONS

International Search Report and Written Opinion of the International Searching Authority, Application No. PCT/SE2013/051218, May 2, 2014.

*Primary Examiner* — Danh Le
(74) *Attorney, Agent, or Firm* — Sage Patent Group

(57) ABSTRACT

The present disclosure relates to a method performed by a network node configured for making automatic predictions in a telecommunication network. The method comprises obtaining a first value of a first key performance indicator (KPI) for a first network entity (NE) in the telecommunication network. The method also comprises obtaining a second value of a second KPI for a communication route between said first NE and a second NE. The method also comprises predicting, automatically and based on the obtained first and second values, that an alarm will be triggered at the second NE.

18 Claims, 3 Drawing Sheets

(56) References Cited

U.S. PATENT DOCUMENTS

| | | | |
|---|---|---|---|
| 2006/0126514 A1* | 6/2006 | Lee | H04L 43/0811 370/238 |
| 2010/0123575 A1* | 5/2010 | Mittal | H04L 41/0609 340/540 |
| 2010/0157843 A1* | 6/2010 | Qian | H04L 45/04 370/254 |
| 2011/0292834 A1 | 12/2011 | Agrawal et al. | |
| 2012/0162265 A1* | 6/2012 | Heinrich | G06Q 10/06393 345/661 |
| 2013/0226655 A1* | 8/2013 | Shaw | G06Q 30/0201 705/7.29 |
| 2014/0157142 A1* | 6/2014 | Heinrich | H04L 67/1095 715/744 |
| 2014/0213191 A1* | 7/2014 | Courtice | H04W 40/12 455/67.11 |
| 2014/0334424 A1* | 11/2014 | Huang | H04W 24/02 370/329 |
| 2015/0049614 A1* | 2/2015 | Yamada | H04L 45/124 370/238 |

\* cited by examiner

ALARM PREDICTION IN A TELECOMMUNICATION NETWORK

CROSS REFERENCE TO RELATED APPLICATION

This application is a 35 U.S.C. §371 national stage application of PCT International Application No. PCT/SE2013/051218, filed on Oct. 18, 2013, the disclosure and content of which is incorporated by reference herein in its entirety. The above-referenced PCT International Application was published in the English language as International Publication No. WO 2015/057119 A1 on Apr. 23, 2015.

TECHNICAL FIELD

The present disclosure relates to a network node and method thereof for monitoring key performance indicators (KPI:s) in a telecommunication network.

BACKGROUND

In a telecommunication network, it is necessary to measure, monitor and act on key parameter indicators (KPI:s) on the Network Elements (NE) and on the links that connect them to maintain the network in an operational state.

There exist specialized units known as Network Operation Centers (NOC:s) configured specifically to monitor KPIs and take appropriate actions when the thresholds of those KPIs are breached.

Generally, KPIs are defined in the Network Element's maintenance manuals and vary for each NE based on its functional scope of existence. The KPIs are exposed to NOCs as MiB (management information base), OiDs (Object Identifiers) and NOCs use applications that support the standard Simple Network Management Protocol (SNMP) to query the KPIs on a periodic basis to monitor their behaviour in terms of exceeding a threshold leading to an alarm that eventually makes the system unstable.

In these aspects, it would be convenient if the next generation NOC solutions strive to predict an alarm condition that is imminent, so as to ensure the required resources are in place to act on it immediately there by reducing the lead time to fix the same which otherwise incur huge revenue loss to the network operator.

Most of the existing solutions primarily address the problem of determining alarm conditions in telecom networks, rather than predicting alarm conditions. Some of the anomaly/outlier detection methods that are used in these aspects are distance based techniques (k-NN), Cluster analysis, Classification (SVM) techniques. Again the challenge in choosing the right method depends on the nature of the KPI. Existing approaches use history logs to build a predictive system. Also, existing approaches are offline learning methods.

U.S. Pat. No. 6,353,902 discloses a system for proactive maintenance of a telecommunications network. A database is created containing characteristics of a plurality of valid logs. These valid logs represent alarms within a network which report status and abnormalities in the network and which have been specifically selected by a network domain expert or administrator from a larger group of logs. The characteristics correspond to a pattern of network fault parameters. The network is monitored for occurrences of a valid log. When a valid log is encountered, future occurrence of a fault is predicted based on an analysis of the valid log and the characteristics found in the database. Corrective measures are taken to prevent the fault from occurring.

SUMMARY

Predicting alarm conditions in real-time has its own challenges. A customized Machine Learning (ML) model specific to the KPI under observation may be used. Such a model must inherently learn on itself with the help of expert input to improve the accuracy of the prediction to avoid false alarms. A System that executes such an ML model preferably meets the real-time requirements of the operator. It may have to eventually match the rate at which the prediction results are made available with the rate at which the KPI is measured.

It may be desired that the system is updated/learnt incrementally. In accordance with embodiments of the present disclosure, it is proposed a method for continuous learning and online prediction of alarms in a telecommunication base station subsystem (BSS). The method may be used to predict alarms of NE:s, at a coarser level, as well as on KPI level, which is at a finer level.

According to an aspect of the present disclosure, there is provided a method performed by a network node configured for making automatic predictions in a telecommunication network. The method comprises obtaining a first value of a first KPI for a first NE in the telecommunication network. The method also comprises obtaining a second value of a second KPI for a communication route between said first NE and a second NE. The method also comprises predicting, automatically and based on the obtained first and second values, that an alarm will be triggered at the second NE.

According to another aspect of the present disclosure, there is provided a computer program product comprising computer-executable components for causing a network node to perform an embodiment of the method aspect of the present disclosure when the computer-executable components are run on processor circuitry comprised in the node.

According to another aspect of the present disclosure, there is provided a network node configured for making automatic predictions in a telecommunication network. The network node comprises processor circuitry, and a storage unit storing instructions that, when executed by the processor circuitry, cause the network node to obtain a first value of a first KPI for a first NE in the telecommunication network. The instructions also cause the network node to obtain a second value of a second KPI for a communication route between said first NE and a second NE. The instructions also cause the network node to predict, automatically and based on the obtained first and second values, that an alarm will be triggered at the second NE. Embodiments of the network node may be configured for performing an embodiment of the method aspect of the present disclosure, and may comprise means or units for performing the method embodiment.

According to another aspect of the present disclosure, there is provided a computer program comprising computer program code which is able to, when run on processor circuitry of a network node configured for making automatic predictions in a telecommunication network, cause the network node to obtain a first value of a first KPI for a first NE in the telecommunication network. The code is also able to cause the network node to obtain a second value of a second KPI for a communication route between said first NE and a second NE. The code is also able to cause the network node to predict, automatically and based on the obtained first and second values, that an alarm will be triggered at the second NE.

By means of embodiments of the present disclosure, an alarm at an NE can be predicted, before it is actually triggered, by studying the environment around the NE, typically upstream of the NE. The changing conditions at other NE(s) and the route(s) between such NE(s) and the NE in question may be monitored, and based on the information obtained from such monitoring a prediction as to whether an alarm will be triggered or not can be made. The network node may be preprogramed for making the automatic prediction, or it may make the prediction based on previous experience e.g. by machine learning. Conditions of the route between the NEs is also taken into account in accordance with the present disclosure, and if there are many different routes between NEs, a plurality of routes may be combined and monitored. Thus, the network node may monitor the network and take actions as needed to avoid e.g. congestion beforehand to reduce the effects of states triggering alarms, or even avoid the triggering of an alarm.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

An alarm, as discussed herein, can be seen as any abnormal behaviour which is related to business or operational need of the network. For example, it may be a low KPI (or a combination of KPIs) value (below a threshold). It may alternatively be a high KPI (or a combination of KPIs) value (exceeding a threshold) or the like.

In general, predicting alarms at NE level or KPI level is a challenging problem. To also achieve an incrementally learning system which considers the topology/domain information is even more challenging. In this disclosure, a telecommunication network (e.g. a base station subsystem, BSS) topology may be modelled as a graphical model which can capture both the interactions/relationships between neighbouring NEs and KPI level interactions. It gives flexibility to model the NEs using time varying KPI vectors (multi-varying distribution or unary potentials) and other system information (such as disk usage, central processing unit (CPU) usage, power level, etc) as well route information using route specific KPI vectors (e.g. pair-wise binary potentials). Prediction of an alarm at an NE or for a KPI in an NE would then be collective, considering both the temporal data of itself and of other related KPI/NE (collective information). The related KPI/NE can be obtained from the network topology which captures the physical connections, or spatial data or using statistical correlations or using any other domain information. It is also possible to model different levels of interactions, pair-wise, at clique level and so on. The motivation to do this may be that a performance of NE/KPI would be affected by degradation of performance at other related NE/KPI. The route level performance may also play a major roll. Thus, the present disclosure may use information about a NE/KPI, other related NE/KPI information and route information combined. Possibly, a Markov Random Field (MRF) model may be used to model the network topology, but any other model suitable model may alternatively be used such as a Bayesian Networks model. KPI information from an NE and a route may be used, and the model may also include other information such as system/network status.

Figure 1:
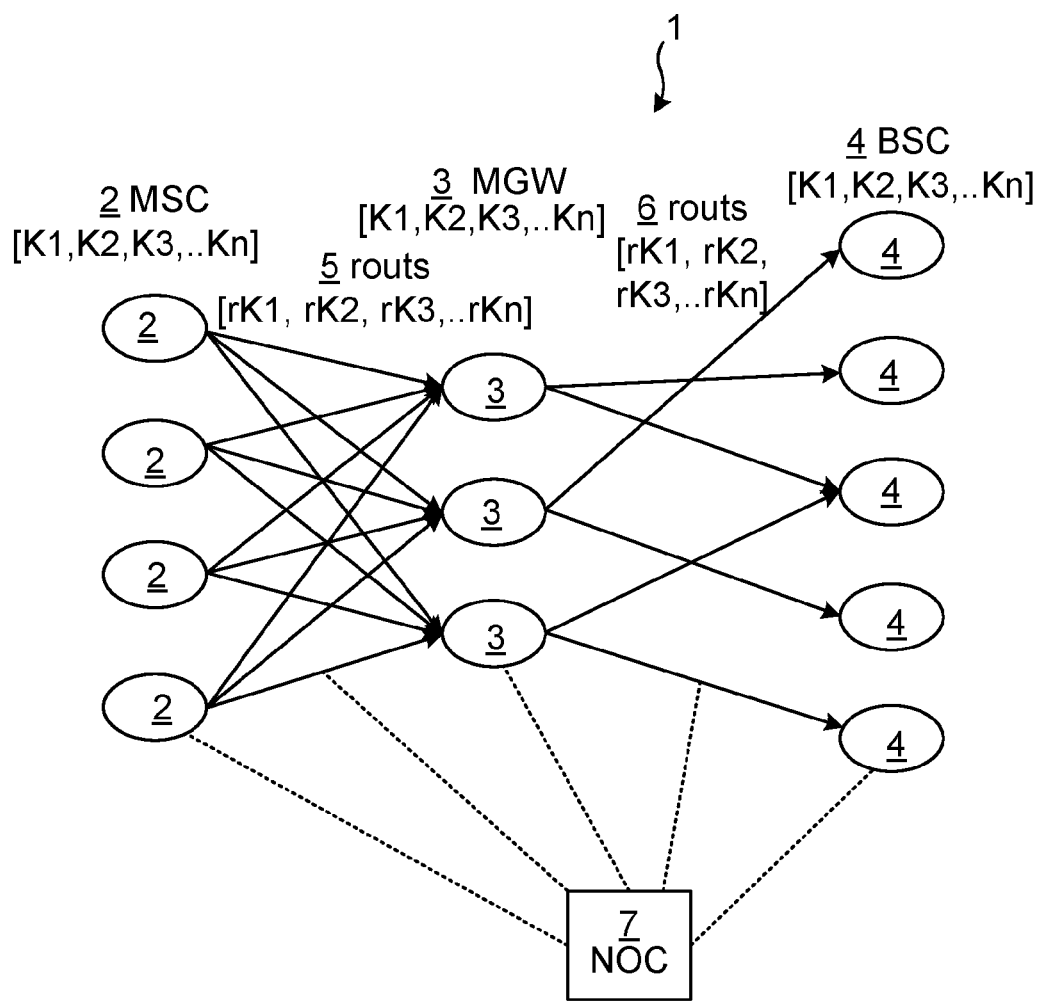
FIG. 1 is a schematic block diagram of a communication network in accordance with the present disclosure.

FIG. 1 illustrates a sample snapshot of a network 1 topology showing how devices/NEs 2, 3 and 4 may be connected to each other via different routes 5 and 6. K1-$n$ indicate key performance indicators and rK1-$n$ indicate route KPIs. In FIG. 1, a Global System for Mobile Communications (GSM) network is shown as an example of a telecommunication network 1 with which the present disclosure may be conveniently used, but any other telecommunication network 1 may also be relevant, such as a Universal Mobile Telecommunications System (UMTS) network or a Long Term Evolution (LTE) network. In the topology of FIG. 1, a plurality of Mobile Switching Centres (MSC) 2 are connected with a plurality of Base Station Controllers (BSC) 4 via a plurality of Media Gateways (MGW) 3. The MSCs, MGWs and BSCs are in the embodiment of FIG. 1 examples of different NEs in accordance with the present disclosure. The NEs 2, 3 and 4 are connected via different communication routes 5 and 6 such that each MSC 2 can communicate with one, several or all of the MGWs 3, and each MGW can communicate with one or several of the BSCs 4. Thus, several different routes are available for communication between an MSC 2 NE and a BSC 4 NE (depending on via which MGW 3). When looking at the route properties of a route between two NEs, the different available routes, and KPIs thereof, may conveniently be combined. Also other nodes or devices in a telecommunication network 1 may be regarded as NEs in accordance with the present disclosure, e.g. Base Transceiver Stations (BTS: s) which may be part of the same Base Station Subsystems (BSS:s) as the BSCs 4 in FIG. 1, and/or mobile stations (MS) e.g. any radio device configured for communication with/via the telecommunication network 1.

As mentioned above, FIG. 1 shows an exemplary telecommunication network 1 in accordance with the GSM standard, but the telecommunication network of the present disclosure may alternatively be in accordance with any other telecommunication standard, e.g. UMTS or LTE, and the NEs may then be configured in accordance with that telecommunication standard. Thus, other examples of NE include a Mobile Switching Center (MSC), a Radio Network Controller (RNC), a Node B and a User Equipment (UE) or other radio device, e.g. a Radio Access Network (RAN) NE, in or for an UMTS network 1, as well as a Mobility Management Entity (MME), a public data network (PDN) gateway, a serving gateway, an evolved Node B (eNB) and a User Equipment (UE) or other radio device, in or for an LTE network 1. Any base station may, e.g., be an NE, e.g. a BSC or BTS of a BSS, a Node B or an eNB.

A radio device NE may be any device or UE, mobile or stationary, enabled to communicate over a radio channel in a communications network 1, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC).

In accordance with the present disclosure, and as illustrated in FIG. 1, a network node 7, in FIG. 1 exemplified as a Network Operations Centre (NOC) 7 but could be an other node e.g. any other network management node 7, monitors and obtains measurement values of KPIs (K1-$n$) of the different NEs 2, 3 and 4 as well as measurement values of KPIs (rK1-$n$) of the different routes 5 and 6 between the NEs. The network node 7 is configured for automatically predicting one or more alarms at an NE 2, 3 or 4, based on the obtained KPI values from other NE(s) 2, 3 and 4 and route(s) 5 and 6. The network node 7 is configured for making automatic predictions of alarms in the telecommunication network 1. In order to be able to make the automatic predictions, the network node 7 may be configured for some sort of automatic learning, e.g. so called machine learning (ML) in order to automatically making the predictions based on previous training, e.g. based on previous alarm triggering in view of the monitored KPIs of related NEs 2, 3 and 4 and routes 5 and 6.

The KPIs monitored by the network node 1 may be any KPIs and may e.g. include any of: amount of used memory in an NE, call answer rate (e.g. at a BSS), amount of used processing power in an NE, power level used by an NE (e.g. a base station or radio device), number of dropped calls (e.g. at a base station), number of data sessions (e.g. at a base station), number of session freezes (e.g. at a base station), and number of connected calls (e.g. at a base station).

According to embodiments of the present disclosure, there are proposed learning and inference methods for a temporal relational classifier. Classical Machine Learning (ML) techniques assume the data to be independent and identically distributed (i.i.d), but real world data of a network 1 is inherently relational and can generally be represented using graphs or some variants of them. This field has recently been receiving a lot of attention in the community under different themes depending on the problem addressed and the nature of solution proposed. Despite that, most of the works handle static networks only, and there is not much attention paid towards temporally dynamic networks. In the present disclosure, the existing relational approaches are extended to attribute evolving networks.

Figure 2A:
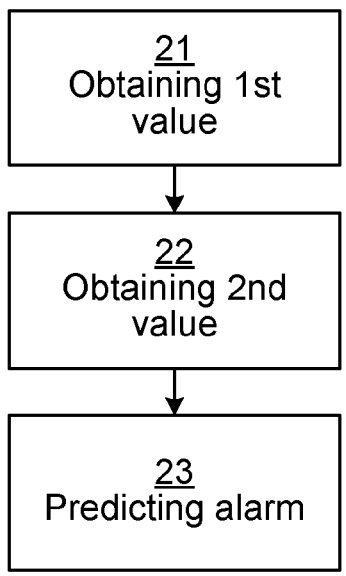
FIG. 2a is a schematic flow chart of an embodiment of a method of the present disclosure.
Figure 2B:
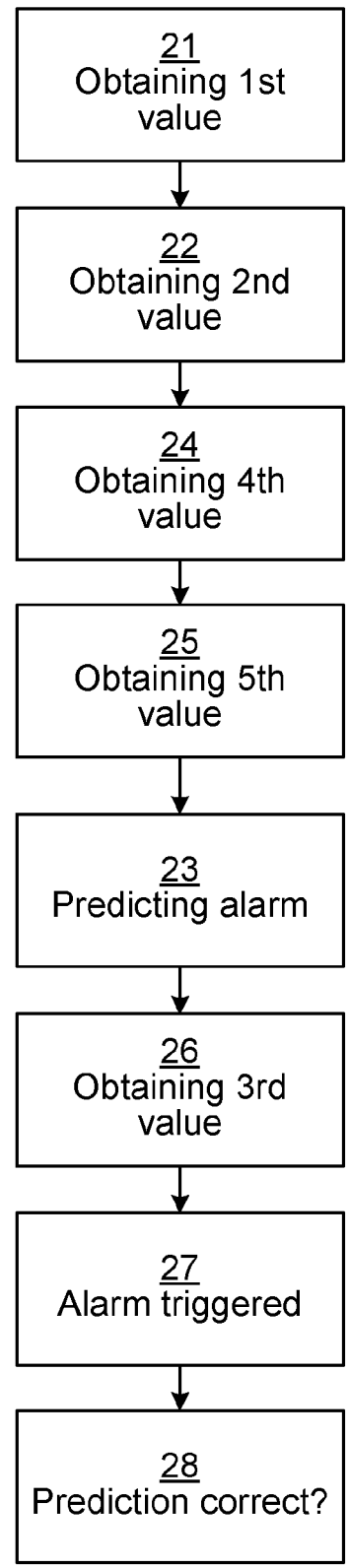
FIG. 2b is a schematic flow chart of another embodiment of a method of the present disclosure.

FIG. 2$a$ is a schematic flow chart on an embodiment of a method of the present disclosure. The method is performed in/by the network node 7 which is configured for making automatic predictions in the telecommunication network 1. The node 7 obtains 21 a first value of a first KPI for a first NE 2; 3 in the telecommunication network 1, which first KPI may be monitored by the node 7. The node 7 also obtains 22 a second value of a second KPI for a communication route 5; 6 between said first NE 2; 3 and a second NE 3; 4, which second KPI the node 7 may also be monitoring. The second NE may typically be downstream of the first NE in a communication chain via the communication routes and/or 6 such that conditions at the first NE may, after a time lag, influence conditions at the second NE. Then, the node 7 automatically predicts 23 that an alarm will be triggered at the second NE 3; 4, based on the obtained first and second values.

FIG. 2$b$ is a schematic flow chart illustrating other embodiments of a method of the present disclosure. The first and second KPI values are obtained 21 and 22 as discussed above in relation to FIG. 2$a$.

In some embodiments, a third value is obtained 26 of a third KPI for the second NE, after having made the prediction 23. The node 7 may then determine 27 that the alarm should be triggered at the second NE in view of the third value, and also determine 28 that the prediction 23 thus was correct. This may be part of the training or learning of the node 7, e.g. ML, in that the node 7 is made aware that a combination of the first and second values relating to conditions upstream in a communication chain of, or otherwise related to, the second NE results in an alarm at the second NE.

In some embodiments, the node 7, before making the prediction 23, obtains 24 a fourth value of a fourth KPI for a third NE 2, 3 or 4. Then, the node 7 may make the prediction 23 that an alarm will be triggered at the second NE 3; 4 based also on the obtained fourth value. Thus, the node 7 may base its prediction on KPI values from several other NEs, improving the prediction basis.

In some embodiments, the node 7, before making the prediction 23, obtains 25 a fifth value of a fifth KPI for the first NE 2; 3. Then, the node 7 may make the prediction 23 that an alarm will be triggered at the second NE 3; 4 based also on the obtained fifth value. Thus, the node 7 may base its prediction on several KPI values from another NE, improving the prediction basis.

Generally, the present disclosure may include obtaining values of any KPIs which may be relevant for predicting an alarm at the second NE, e.g. KPIs from several different other NEs and/or several KPIs from an other NE. Conveniently, a large number of KPIs which may influence future conditions at the second NE may be monitored by the node 7. In some embodiments, KPI value(s) of KPI(s) of the second NE are also used for basing the alarm prediction on.

Figure 3:
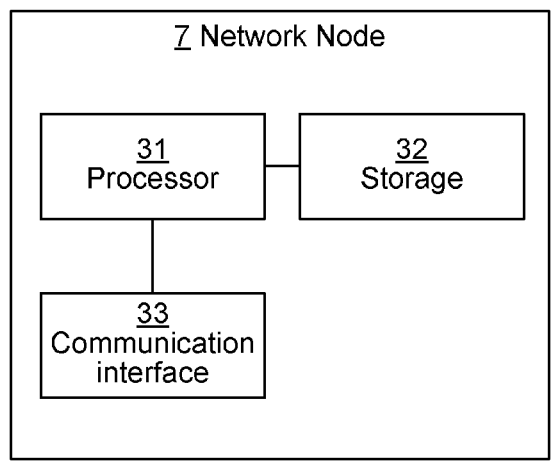
FIG. 3 is a schematic block diagram of an embodiment of a network node of the present disclosure.

FIG. 3 schematically illustrates an embodiment of a network node 7 according to the present disclosure. The network node 7 comprises processor circuitry 31 e.g. a central processing unit (CPU). The processor circuitry 31 may comprise one or a plurality of processing units in the form of microprocessor(s). However, other suitable devices with computing capabilities could be comprised in the processor 31, e.g. an application specific integrated circuit (ASIC), a field programmable gate array (FPGA) or a complex programmable logic device (CPLD). The processor circuitry 31 is configured to run one or several computer program(s) or software stored in a storage unit 32 e.g. a memory. The storage unit is regarded as a computer readable means and may e.g. be in the form of a Random Access Memory (RAM), a Flash memory or other solid state memory, or a hard disk, or be a combination thereof. The storage unit 32 may e.g. store an embodiment of a computer program according to the present disclosure, which may be run by the processing circuitry 31 to cause an embodiment of the network node 7 to perform an embodiment of the method of the present disclosure. The processor circuitry may thus provide a means of the network node 7 for performing the method steps of any embodiment of the method of the present disclosure, possibly in cooperation with the storage 32 and/or the communication interface 33. The processor circuitry 31 is also configured to store data in the storage unit 32, as needed. The network node 7 also comprises a communication interface 33 configured for allowing the node 7 to communicate, via wire or wirelessly depending on the network 1 configuration, with other nodes or NEs of the network 1. The communication interface may e.g. comprise, or be otherwise associated with, a transmitter and a receiver, and possibly an antenna, in the node 7.

Figure 4:
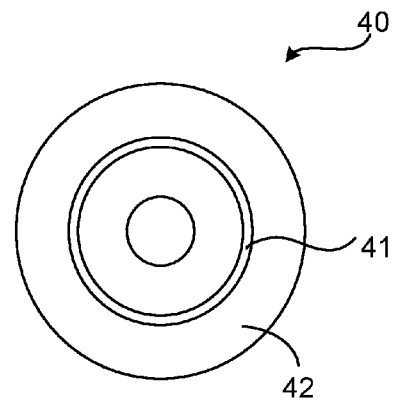
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause a network node 7, e.g. as discussed herein, for automatic alarm prediction in a telecommunication network 1 to perform an embodiment of the method of the present disclosure. The computer program/computer-executable components may be run on the processor circuitry 31 of the node 7 for causing the node to perform the method. The computer program product 40 may e.g. be comprised in a storage unit or memory 32 comprised in the node 7 and associated with the processor circuitry 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

EXAMPLE

Here an exemplary embodiment of the (i) modeling part (ii) learning and (iii) inference steps of the method of the present disclosure is discussed. There is also provided sample experimental results using data obtained from an operator.

Modelling: Here NE topology is modelled as a Markov random field (MRF). Each NE 2, 3, 4 will be a device and edges will be routes 5, 6 between the NEs. Since there could be multiple routes between two NEs; the feature vectors of multiple routes are transformed into a single feature vector that summarizes the information of all the routes.

Figure 5:
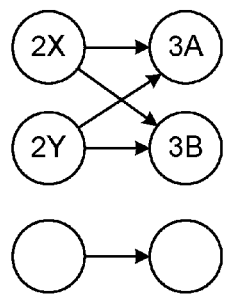
FIG. 5 is a schematic block diagram of an exemplary embodiment of a communication network in accordance with the present disclosure.

Summarizing multiple routes: For a pair of NEs, say NE 2X and NE 2Y in FIG. 5, there can be multiple routes (R) of information till time 't−1' $<R_{xyt-1}>$. $<R_{xyt-1}>$ is converted to $r_{xyt}$. This is achieved by learning a function which uses a summary of $<R_{xyt-1}>$, denoted as $S(R_{xyt-1})$, summary can be generated using like sum, mean, mode, max, min, exponential moving average, etc. $f(S(R_{xyt-1})) \rightarrow r_{xyt}$, $R_{xy}$ and $r_{xy}$ are the route KPI values. Multiple Rxy (route KPI values) are transformed to one $r_{xy}$. For example, if there are three routes between NEs 2X and 2Y, and one KPI value 'R' for the route, then R1, R2 and R3 for the three routes are mapped to a single value 'r'. It is done using any predefined/learnt function. Examples of predefined function include average, sum, geometric mean etc. For a learnt function it would be learning a regression function.

Order of dependency/Dependency radius: Here the order or dependency circle is identified. It may not be the case that always the immediate neighbourhood would influence a n NE in the topology. Intuition is explained below using a sample topology and with reference to FIG. 5. If the immediate neighbourhood only is used, then NE 3A would be dependent on NEs 2X and 2Y only. Intuitively, it can be seen that, if there is an increase in load at 2X, it would not affect 3A proportionately, since the load will be balanced using NE 3B. A degree of degradation at 3A would depend on the state of 3B also. So the dependency radius for a node N is defined, as NEs connected to it Nei (N) and other nodes connected to Nei (N) at the same level in topology. Nei(N) denotes neighbour NEs in the topology, i.e. NEs that are connected to the NE "N". Here, NEs 2X and 2Y belong to the same level in the network 1, and NEs 3A and 3B belong to another same level. We denote this as DR(N), where DR(N) denotes dependency radius of the NE N, which need not be only Nei(N) NEs. Any NE which can have an impact on another NE would be within its dependency radius.

Learning: With the labelled history information, the model is learned to the node 7, with P (c|NE, DR(NE))$\alpha$P (c|DR(NE))=P(NE|c)*$\pi_{i_{eDR(NE)}}$P(Ni|c)*P(c), where c refers to alarm, P(c|NE, DR(NE)) refers to a probability of alarm given an NE and its dependency radius. $\alpha$P(c|DR(NE)) means that it is proportional to P(c|NE, DR(NE)). For simplicity the formula may be re-written as P (c|NE, DR(NE))=P(NE|c)*$\pi_{i_{eDR(NE)}}$ P(Ni|c)*P(c). This means that P(c|NE, DR(NE) can be computed as P(NE|c)*$\pi_{i_{eDR(NE)}}$ P(Ni|c)*P(c). $\pi_{i_{eDR(NE)}}$ P(Ni|c)*P(c) implies multiplication of ($\pi$ operator) the probability of alarm with regard to each NE (Ni) in the dependency radius. An NE can be represented using the raw temporal data or summarized temporal information like using exponential moving average, linear kernel, etc. to build a feature vector from 1 to t−1 or in a time window W. This is achieved by using data points from multiple snapshots of the topology network 1. Additional context feature values for 't' may also be used, such as day of week, time window in a particular day and so on.

For alarm prediction using KPI values, the DR(KPI) includes all other KPI values in the same NE and NE in the dependency circle of that device. In-order to reduce variance, and also allow real-time prediction without delay during inference using stacked values while learning. If KPI(2X) and KPI(2Y) are correlated with a time lag o, then the estimated value of KPI(2X) is used for KPI(2Y) alarm prediction. Similarly, if the lag is 1, then expected deviation of KPI(2X) is used for KPI(2Y) alarm prediction.

For each KPI, Kq refers to the KPI of the second NE which is predicted to trigger an alarm and represent its temporal information at t, say using the values or summary by applying methods such as kernel, linear smoothing, exponential smoothing from the past (1 to 1) or in a time window W (t−W to t)

Figure 6:
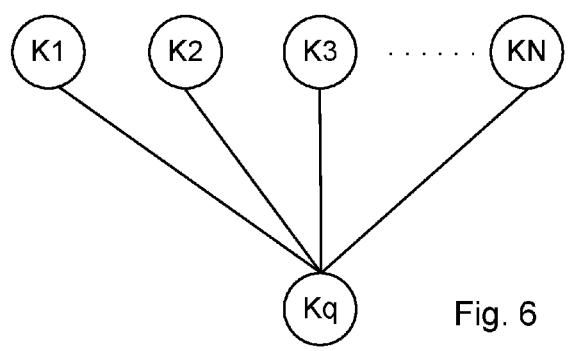
FIG. 6 is a schematic illustration of how values of several KPIs can be monitored for predicting a future alarm with respect to another KPI (Kq).

Also used are other (correlated) KPI values' temporal information from the same NE and other nodes connected in the network 1 topology (K1 to KN) w.r.t the lag computed above. See FIG. 6.

This can be done with different temporal representations and window sizes.

With the choice of a classifier such as Naïve Bayesian, Averaged one-dependence estimators (AODE), k-nearest neighbour algorithm (KNN) like algorithms, the collective classifier will be inherently incremental (online)

Inference: With the values observed at Time T at MSC 2, the alarms for T+Δ can be predicted at MGW 3. Similarly with values observed at Time T at MSC 2 and MGW 3, the alarms for T+Δ can be predicted at BSC 4. This can be seen as that inference for each MO_NAME KPI will be handled by a PE/Bolt, and the values will be passed to other PEs/Bolts which handle computation of related (from topology or correlation analysis) KPI alarm prediction. Since the expected values are used, related NE/KPI values can be passed and inference (alarm prediction) for all NE/KPIs can be done simultaneously. PE/Bolt are processing units in distributed online learning. They are terminologies from S4/Storm respectively (http://incubator.apache.org/s4/, http://storm-project.net/).

Results: In a snapshot for a month's data for dynamic service KPI for various NEs, it can be visually seen a deviation in performance of a related KPI at a particular time stamp with regard to other related KPIs. This particular pattern is what is defined as an alarm (to be predicted in previous timestamps). From the 1 month data, two connected NEs are chosen. 12 days were used for training and 11 days were used for testing. One NE was a BSC 4 and one other was an MGW 3.

Proposed Setup I: Monitor a KPI for time W and also the related KPIs and predict alarm in t+1

Proposed Setup II: If another KPI(2Y) is correlated with lag o, then use the expected value of other KPI(2Y) at t+1. If KPI(2Z) is correlated with a lag is −1, then use deviation value (actual-expected) of KPI(2Y) at t. This setup uses extracted temporal features. Expected values are computed by training a Neural Networks regression model.

Note: Used are values in a day and across days for the window W. For instance, if W is 3, then 3 values are used in a day till t, and values for previous 3 days (including the current day) at the same time t, to predict alarm at t+1

Used is a Naïve Bayesian Classifier since it is inherently incremental and can be deployed online Below follows another aspect of the present disclosure.

According to an aspect of the present disclosure, there is provided a network node 7 configured for making automatic predictions in a telecommunication network 1. The node 7 comprises means 31, 33 for obtaining 21 a first value of a first key performance indicator (KPI) for a first Network Element (NE) 2; 3 in the telecommunication network. The node 7 also comprises means 31, 33 for obtaining 22 a second value of a second KPI for a communication route 5; 6 between said first NE and a second NE 3; 4. The node 7 also comprises means 31 for predicting 23, automatically and based on the obtained first and second values, that an alarm will be triggered at the second NE 3; 4.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network node configured for making automatic predictions in a telecommunication network, the method comprising:

obtaining a first value of a first key performance indicator (KPI) for a first Network Element (NE) in the telecommunication network;

obtaining a second value of a second KPI for a communication route between said first NE and a second NE; and predicting, automatically and based on the obtained first and second values, that an alarm will be triggered at the second NE, wherein the network node is configured for automatic learning in the form of Machine Learning (ML), and wherein the predicting that an alarm will be triggered at the second NE is based on the ML.

2. The method of claim 1, further comprising:

obtaining a fourth value of a fourth KPI for a third NE;

wherein the predicting that an alarm will be triggered at the second NE is based also on the obtained fourth value.

3. The method of claim 1, further comprising:

obtaining a fifth value of a fifth KPI for the first NE;

wherein the predicting that an alarm will be triggered at the second NE is further based on the obtained fifth value.

4. The method of claim 1, wherein the network node is a network management node comprising a Network Operations Centre (NOC).

5. The method of claim 1, wherein the first KPI is one from the group consisting of: amount of used memory, call answer rate, amount of used processing power, power level, number of dropped calls, number of data sessions, number of session freezes, and number of connected calls.

6. The method of claim 1, wherein the predicting that an alarm will be triggered is done by operations according to a Markov Random Field (MRF) model or a Bayesian Networks model.

7. The method of claim 1, wherein the second value relates to a combination of a plurality of communication routes between the first NE and the second NE.

8. The method of claim 1, wherein the telecommunication network is a Global System for Mobile Communications (GSM) network.

9. The method of claim 8, wherein the first and/or second NE is one from the group consisting of: a Mobile Switching Center (MSC), a media gateway (MGW), a base station controller (BSC), a base transceiver station (BTS) and a mobile station (MS).

10. The method of claim 1, wherein the telecommunication network is a Universal Mobile Telecommunications System (UMTS) network.

11. The method of claim 10, wherein the first and/or second NE is one from the group consisting of: a Mobile Switching Center (MSC), a Radio Network Controller (RNC), a Node B and a User Equipment (UE).

12. The method of claim 1, wherein the telecommunication network is a Long Term Evolution (LTE) network.

13. The method of claim 12, wherein the first and/or second NE is one from the group consisting of: a Mobility Management Entity (MME), a public data network (PDN) gateway, a serving gateway, an evolved Node B (eNB), and a User Equipment (UE).

14. A computer program product comprising a non-transitory computer readable storage medium storing program code that when executed by processor circuitry of a network node causes the network node to perform the method of claim 1.

15. A method performed by a network node configured for making automatic predictions in a telecommunication network, the method comprising:

obtaining a first value of a first key performance indicator (KPI) for a first Network Element (NE) in the telecommunication network;

obtaining a second value of a second KPI for a communication route between said first NE and a second NE;

predicting, automatically and based on the obtained first and second values, that an alarm will be triggered at the second NE;

obtaining a third value of a third KPI for the second NE;

determining that the alarm should be triggered at the second NE based on the third value; and determining as part of automatic learning, that the prediction was correct.

16. A network node configured for making automatic predictions in a telecommunication network, the node comprising:

processor circuitry; and a storage unit storing instructions that, when executed by the processor circuitry, cause the node to perform operations comprising:

obtaining a first value of a first key performance indicator (KPI) for a first Network Element (NE) in the telecommunication network;

obtaining a second value of a second KPI for a communication route between said first NE and a second NE; and predicting, automatically and based on the obtained first and second values, that an alarm will be triggered at the second NE, wherein the network node is configured for automatic learning in the form of Machine Learning (ML), and wherein the predicting that an alarm will be triggered at the second NE is based on the ML.

17. The network node of claim 16, wherein the network node is a network management node.

18. A non-transitory computer readable storage medium storing a computer program including program code that when run on processor circuitry of a network node configured for making automatic predictions in a telecommunication network, cause the network node to perform operations comprising:

obtaining a first value of a first key performance indicator (KPI) for a first Network Element (NE) in the telecommunication network;

obtaining a second value of a second KPI for a communication route between said first NE and a second NE; and predicting, automatically and based on the obtained first and second values, that an alarm will be triggered at the second NE, wherein the network node is configured for automatic learning in the form of Machine Learning (ML), and wherein the predicting that an alarm will be triggered at the second NE is based on the ML.

* * * * *